United States Patent
Janik et al.

(10) Patent No.: US 6,610,337 B1
(45) Date of Patent: Aug. 26, 2003

(54) DROPS OF HONEY

(75) Inventors: John Joseph Janik, Kensington, CT (US); Susan Barbara Janik, Berlin, CT (US); Dorothy Linda Carlone, Kensington, CT (US)

(73) Assignees: John J. Janik, Kensington, CT (US); Susan B. Janik, Berlin, CT (US); Dorothy L. Carlone, Berlin, CT (US)

( * ) Notice: Subject to any disclaimer, the term of this patent is extended or adjusted under 35 U.S.C. 154(b) by 0 days.

(21) Appl. No.: 10/334,827

(22) Filed: Dec. 31, 2002

(51) Int. Cl.[7] .............................. A23G 3/00; A61K 9/00
(52) U.S. Cl. .................... 426/103; 424/400; 424/439; 424/451; 424/452; 424/455; 424/463; 426/89; 426/90; 426/138; 426/282
(58) Field of Search .................... 424/400, 439, 424/451, 452, 455, 463; 426/89, 90, 103, 138, 282

(56) References Cited

U.S. PATENT DOCUMENTS 4,804,542 A * 2/1989 Fischer et al. ............... 424/456
5,270,064 A * 12/1993 Shultz ........................ 426/90

FOREIGN PATENT DOCUMENTS

| EP | 199034 A1 | * 10/1986 | ............ A61K/9/48 |
| GB | 2310349 A | * 8/1997 | ............ A01K/85/01 |
| JP | 04030749 A | * 2/1992 | ............ A23G/1/00 |
| JP | 10042805 A | * 2/1998 | ............ A23L/1/08 |

* cited by examiner

*Primary Examiner*—Thurman K. Page
*Assistant Examiner*—Charesse Evans

(57) ABSTRACT

Drops of Honey is a capsule made of hydroxymethlcellulose that is filled with honey. Drops of Honey is a food product in which its capsule dissolves in boiling water. This allows for the honey to escape into the beverage of choice, preferably tea. It is a food product that will be mainly used with tea and other hot beverages.

2 Claims, 1 Drawing Sheet

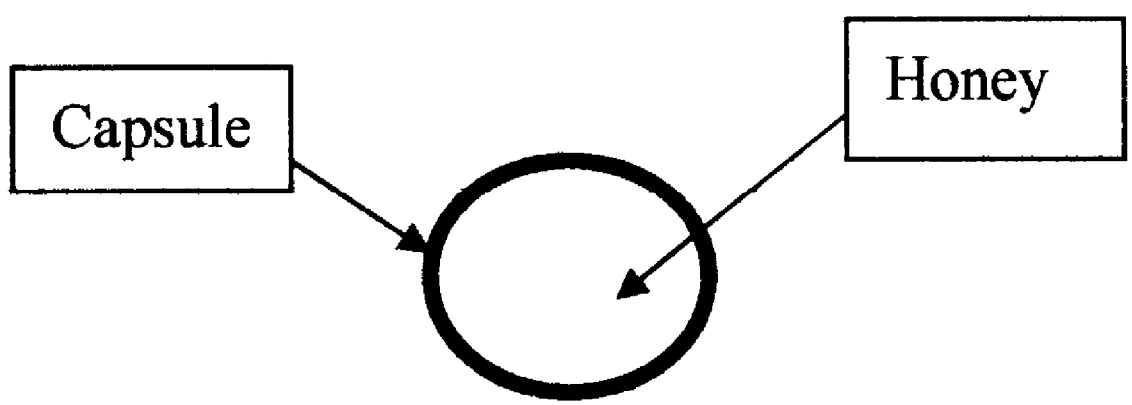

DROPS OF HONEY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Drops of Honey is a food product to be mainly used with tea and other hot beverages. Drops of Honey is a capsule filled with honey. The capsule dissolves in boiling water and allows for the honey to escape into the beverage of choice.

SUMMARY OF THE INVENTION

Drops of Honey is a capsule made of hydroxymethlcellulose that is filled with honey. The hydroxymethicellulose capsule is made from 92% methylcellulose and 8% water. It is shaped in the form of a ball that is ⅜ths in diameter. The object of the invention is for the hydroxymethlcellulose capsule to dissolve in boiling water. This will allow for the honey to then escape in to the beverage of choice.

BRIEF DESCRIPTION OF THE SEVERAL VIEWS OF THE DRAWING

The hydroxyrnethlcellulose capsule is ⅜ths in diameter and filled with honey.

DETAILED DESCRIPTION OF THE INVENTION

Drops of Honey is a food product to be mainly used with tea and other hot beverages. Drops of Honey is a capsule made of hydroxymethlcellulose that is filled with honey. The hydroxymethlcellulose capsule is made from 92% methylcellulose and 8% water. It is shaped in the form of a ball that is ⅜ths in diameter. The hydroxymethlcellulose capsule dissolves in boiling water. This will allow for the honey to escape into the beverage of choice, preferably tea.

We claim:

1. A composition consisting of a capsule consisting of hydroxymethylcellulose, wherein the capsule is filled with honey.

2. A food product consisting of a composition consisting of a capsule consisting of hydroxymethylcellulose, wherein the capsule is filled with honey.

* * * * *